(12) United States Patent
Adams et al.

(10) Patent No.: US 7,699,372 B2
(45) Date of Patent: Apr. 20, 2010

(54) INTEGRATED CAR TOP CARRIER

(75) Inventors: John R. Adams, Clarkston, MI (US); E. Mackey King, Howell, MI (US); Paul G. Lester, Commerce Township, MI (US); Alan Townsend, Brighton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 406 days.

(21) Appl. No.: 11/684,660

(22) Filed: Mar. 12, 2007

(65) Prior Publication Data

US 2008/0224492 A1 Sep. 18, 2008

(51) Int. Cl.
*B60R 9/045* (2006.01)
*B60R 9/05* (2006.01)

(52) U.S. Cl. .................. 296/26.07; 224/324; 224/327; 296/37.7

(58) Field of Classification Search ............... 296/37.7, 296/37.5, 26.04, 26.06, 26.07, 160, 163, 296/165; 224/324, 327
See application file for complete search history.

(56) References Cited

U.S. PATENT DOCUMENTS

| | | | | |
|---|---|---|---|---|
| 1,762,640 | A | * | 6/1930 | Sanford ....................... 296/178 |
| 4,262,956 | A | * | 4/1981 | Kellam ..................... 296/26.07 |
| 4,339,223 | A | | 7/1982 | Golze |
| 5,667,116 | A | | 9/1997 | Reinhart et al. |
| 6,234,371 | B1 | | 5/2001 | Sinn |
| 6,257,470 | B1 | | 7/2001 | Schaefer |
| 6,681,970 | B2 | | 1/2004 | Byrnes |
| 6,772,926 | B2 | | 8/2004 | Eichele et al. |
| 6,997,497 | B2 | | 2/2006 | Sagi et al. |
| 7,055,896 | B2 | | 6/2006 | Ozkok et al. |
| 2003/0141735 | A1 | | 7/2003 | Albaisa et al. |
| 2005/0116511 | A1 | | 6/2005 | Leroy et al. |

FOREIGN PATENT DOCUMENTS

FR 1092594 * 4/1955 ................. 296/37.7

* cited by examiner

*Primary Examiner*—Dennis H Pedder
(74) *Attorney, Agent, or Firm*—Ralph E. Smith

(57) ABSTRACT

A cargo carrier integrated a vehicle roof such that the cargo carrier is deployable from a stowed position within the vehicle roof to a deployed position that extends from the vehicle roof. The cargo carrier includes a bottom panel disposed within a recess formed in the vehicle roof, and a pair of side panels disposed within and hingedly connected to the bottom panel. The side panels are actuatable between the stowed position and the developed position. A front panel and a top panel are hingedly connected to each other and attached to the bottom panel. To deploy the cargo carrier, a deployment system is connected to the side panels for actuating the side panels between the stowed position and the deployed position. Actuation of the side panels raises the top panel and the front panel to the deployed position.

8 Claims, 17 Drawing Sheets

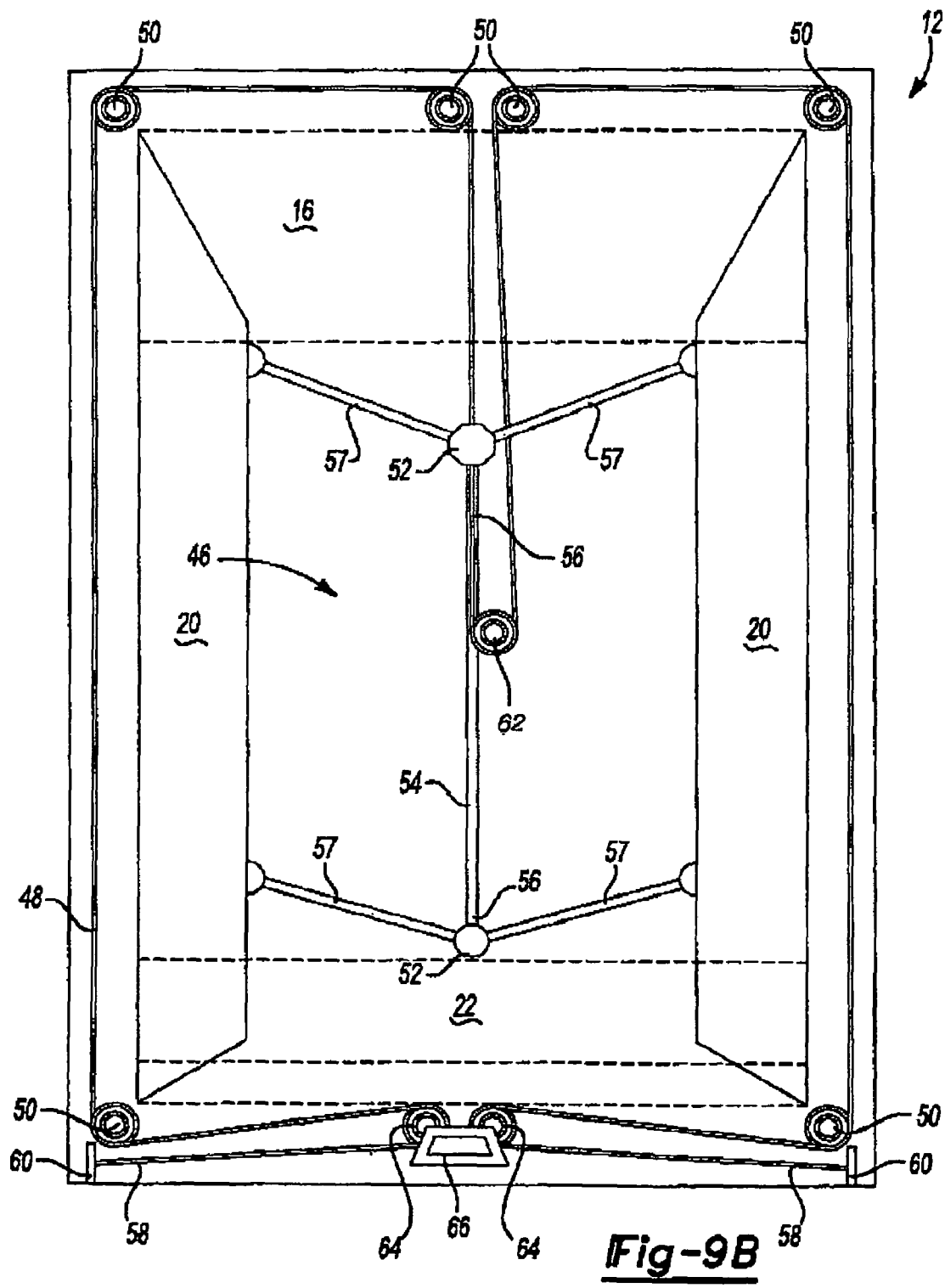

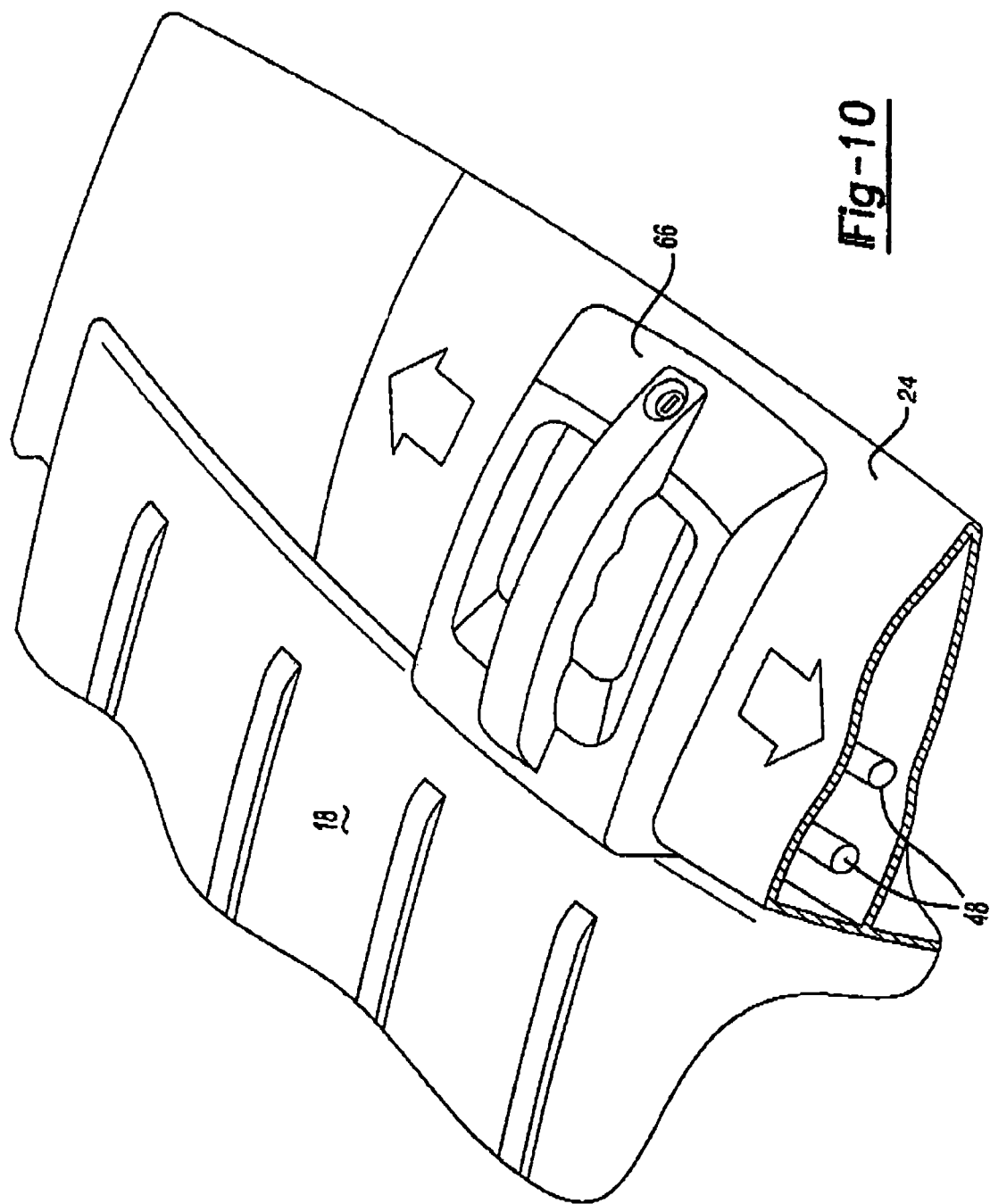

INTEGRATED CAR TOP CARRIER

FIELD OF THE INVENTION

The present invention relates to a deployable vehicle cargo carrier that is integrated with a roof-top of a motor vehicle.

BACKGROUND OF THE INVENTION

Roof-top devices that are fitted as an accessory to the roof of a motor vehicle and that increase the stowage volume in addition to the vehicle's normal luggage compartment are known in the art. Conventional roof-top devices are generally attached to a roof rack system or are connected directly with the vehicle roof by attachment feet, claws, or the like. As a result, conventional roof-top devices are subject to a disadvantage in that the device may only be used in conjunction with a roof rack system or have complicated attachment devices to connect the roof-top device to the vehicle roof to ensure reliable attachment while the vehicle is being driven.

SUMMARY OF THE INVENTION

A cargo carrier integrated a vehicle roof such that the cargo carrier is deployable from a stowed position within the vehicle roof to a deployed position that extends from the vehicle roof. The cargo carrier includes a bottom panel disposed within a recess formed in the vehicle roof, and a pair of side panels disposed within and hingely connected to the bottom panel. The side panels are actuatable between the stowed position and the deployed position. A front panel and a top panel are hingedly connected to each other and attached to the bottom panel. To deploy the cargo carrier, a deployment system is connected to the side panels for actuating the side panels between the stowed position and the deployed position. Actuation of the side panels raises the top panel and the front panel to the deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 9A-9C are schematic views of the deployment system illustrated in FIG. 7;

FIG. 10 is a perspective view of an actuation deice that may be used to actuate a deployment system according to the present teachings;

DETAILED DESCRIPTION OF THE PREFERRED EMBODIMENTS

The following description of the preferred embodiment(s) is merely exemplary in nature and is in no way intended to limit the invention, its application, or uses.

Figure 1:
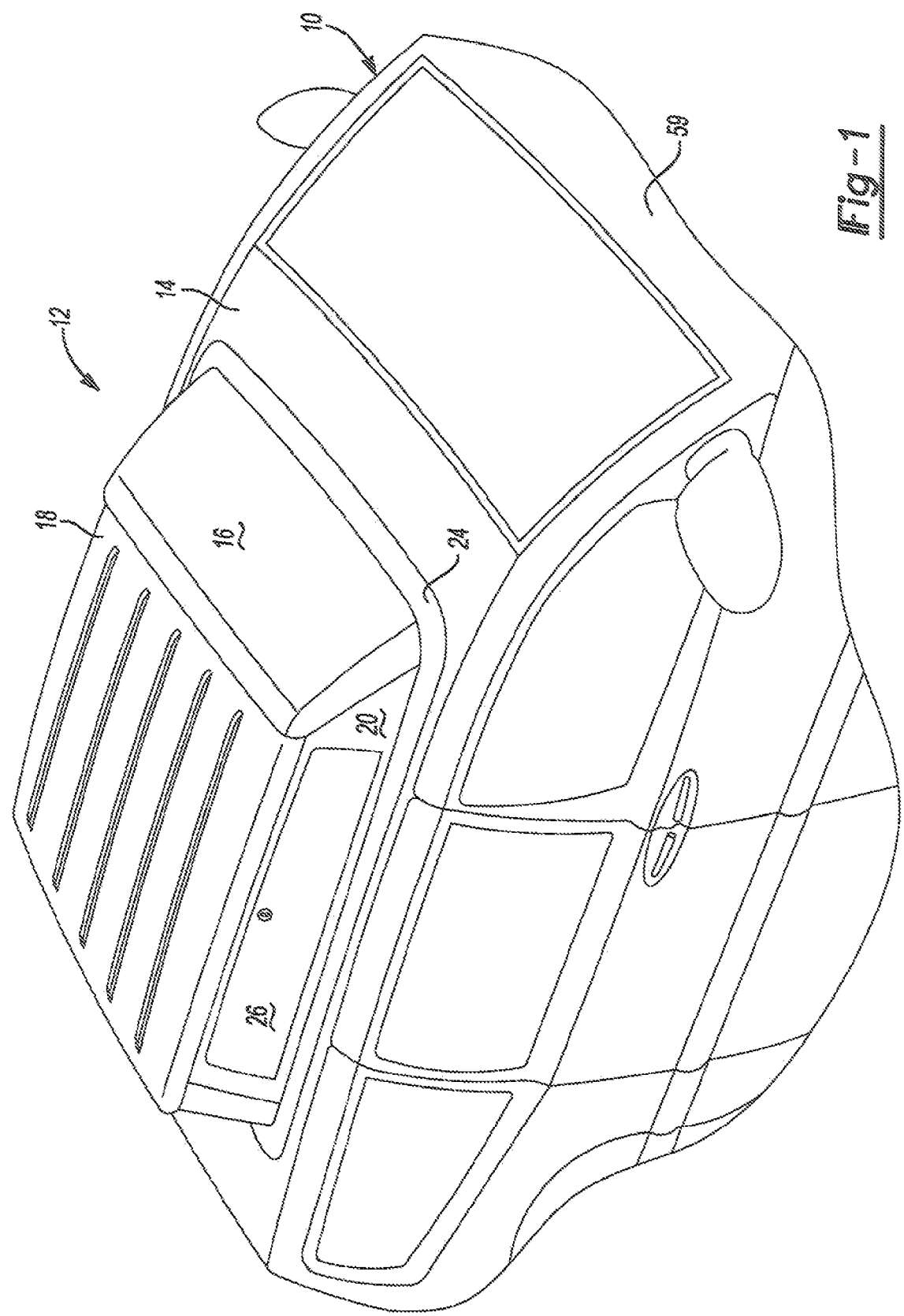
FIG. 1 is a perspective view of an integrated roof-top cargo carrier in a deployed position according to the present teachings.

FIGS. 1-4 illustrate a vehicle 10 including a deployable cargo carrier 12 that is integrated with a roof-top 14 of the vehicle 10. The deployable cargo carrier 12 illustrated in FIG. 1 is showed in a deployed position. The deployable cargo carrier generally extends upward from the roof-top 14 of the vehicle 10 and includes a front panel 16, a top panel 18, and a pair of side panels 20. Although not shown in FIG. 1, it should be understood that the deployable cargo carrier 12 also includes a rear panel 22.

Figure 2:
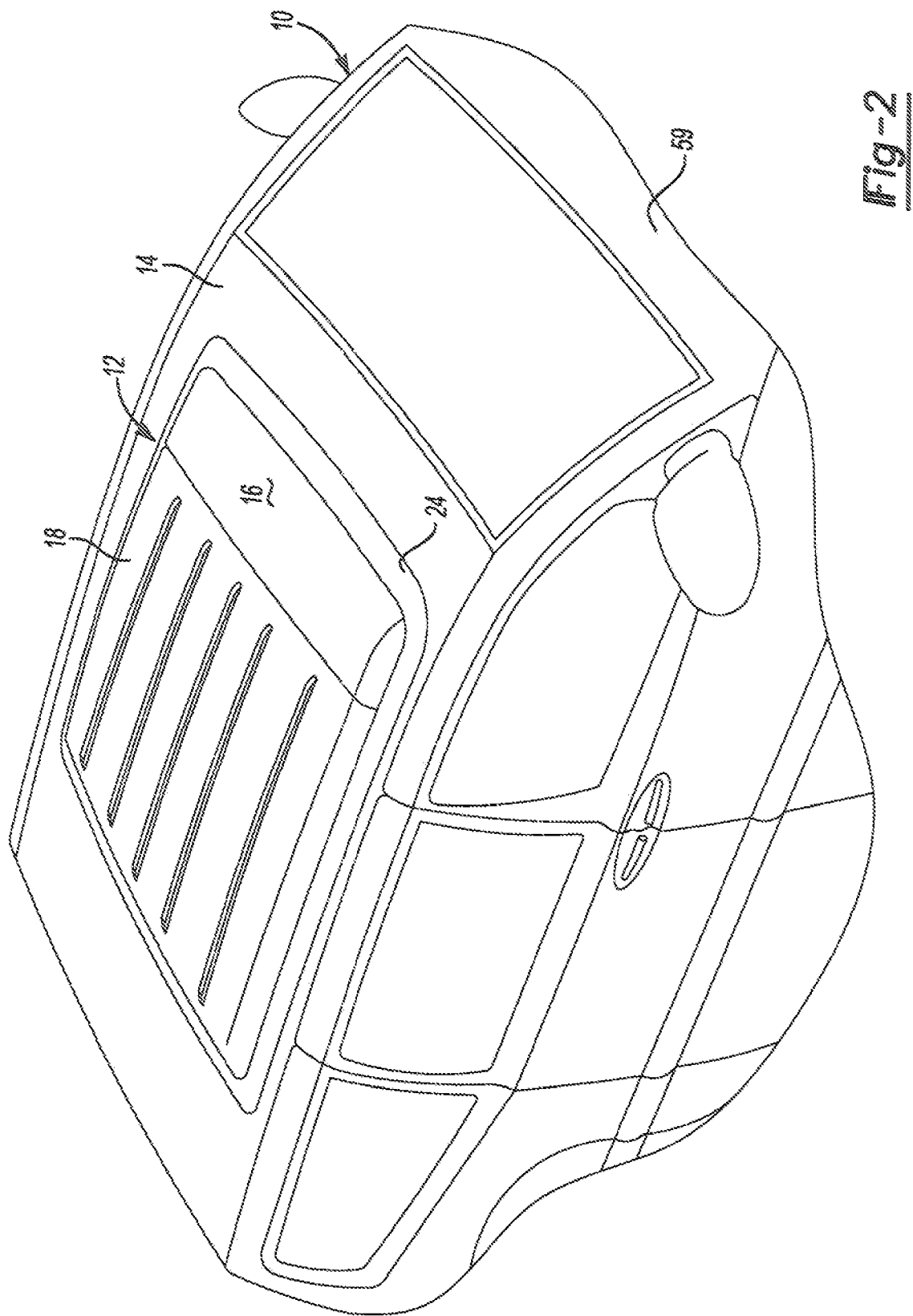
FIG. 2 is a perspective view of the integrated roof-top cargo carrier in a stowed position according to the present teachings.

The deployable cargo carrier 12 is illustrated in FIG. 2 in an un-deployed position. In the un-deployed state of the cargo carrier 12, only the front panel 16 and top panel 18 are visible. Surrounding the front and top panels 16 and 18 is a collar 24 that houses various seals (not shown) and deployment mechanisms (not shown) that will be described in detail later.

The deployable cargo carrier 12 in its un-deployed state sits within and is integrated with the roof-top 14 of the vehicle 10. In this regard, it should be understood that the cargo carrier 12 is adapted to fit within a normal stock vehicle roof 14. That is, no modifications to a vehicle roof 14 with respect to its thickness are necessary to accommodate the cargo carrier 12 of the present teachings. The cargo carrier 12, rather, is adapted to fit within the roof 14 of the vehicle 10 in a manner similar to conventional sunroofs or moonroofs. Accordingly, the cargo carrier 12 may be accommodated within any roof 14 of a vehicle 10 that is known in the art.

Figure 3:
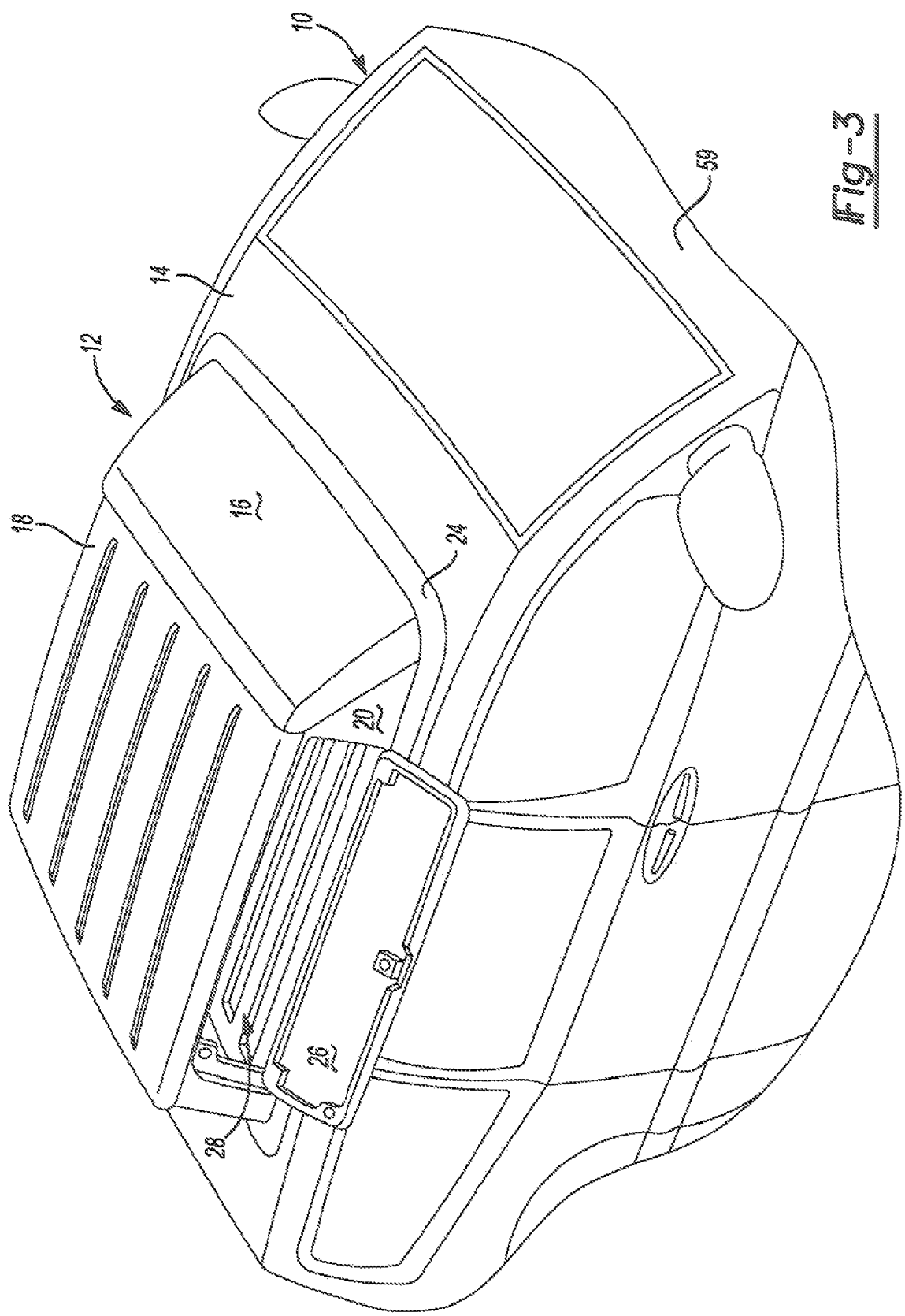
FIG. 3 is another perspective view of the integrated roof-top cargo carrier in a deployed position according to the present teachings.
Figure 4:
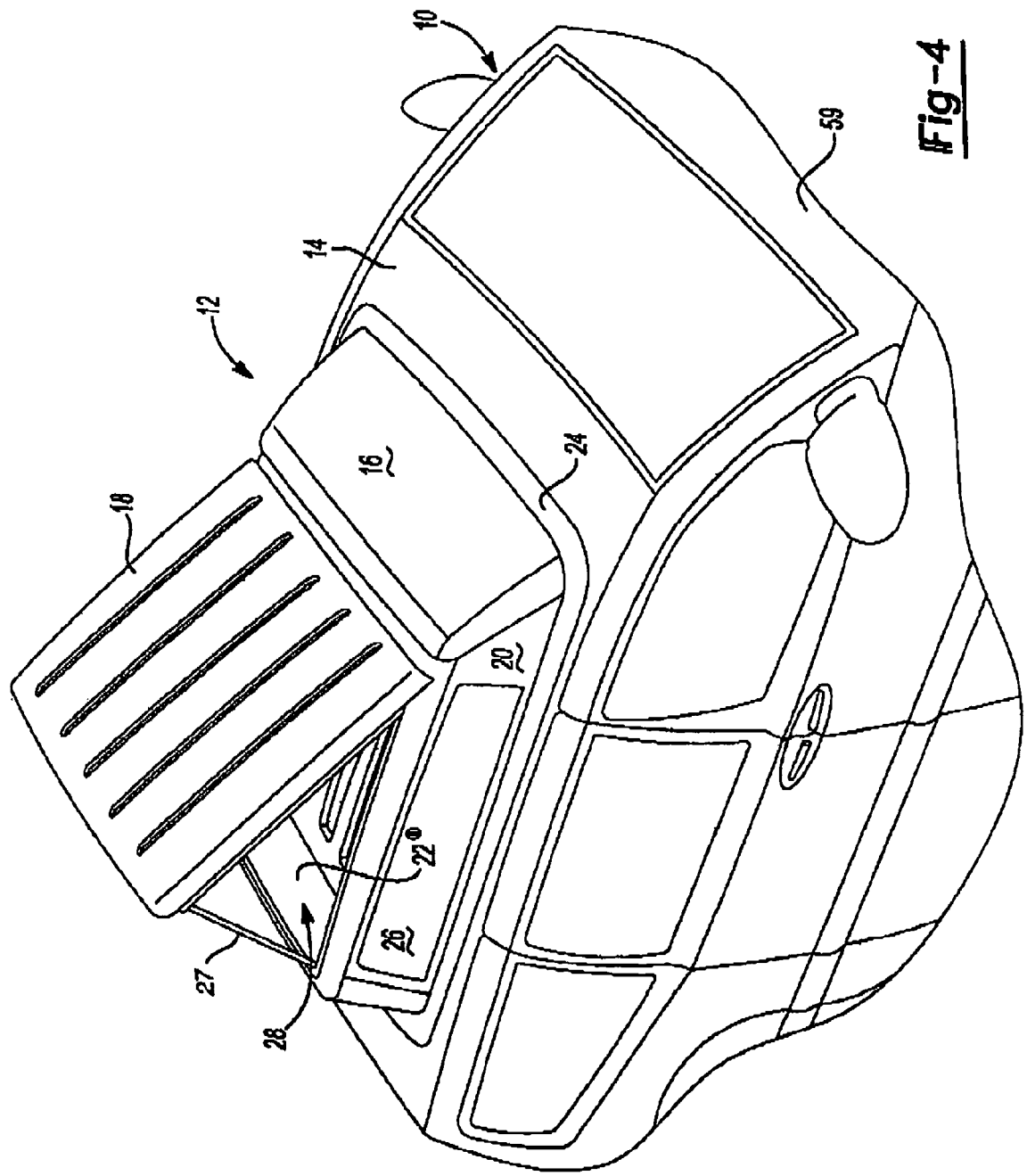
FIG. 4 is another perspective view of the integrated roof-top cargo carrier in a deployed position according to the present teachings.

In FIGS. 3 and 4, the cargo carrier 12 may include a doorway 26 that provides access to the interior 28 of the cargo carrier 12. FIG. 3 illustrates a configuration where the doorway 26 is provided in at least one of the side panels 20. FIG. 4 illustrates a configuration where the top panel 18 may be adapted to pivot relative to the front and side panels 16 and 20. To pivot the top panel 18, hydraulic bars 27 or the like may be used. Regardless, it should be understood that the cargo carrier 12 may be provided with various access doors 26 that provide access to the interior 28. Further, it should be understood that the cargo carrier 12 may include both a door 26 formed in a side panel 20 as well as a pivoting top panel 18.

The panels 16, 18, and 20 of the cargo carrier 12 may be formed of any material known to one skilled in the art. In this regard, preferably materials for the panels 16, 18, and 20 include lightweight steel or thermoplastics. Regardless, it should be understood that the materials of the cargo carrier 12 should provide rigidity and strength. In this manner, if the vehicle 10 rolls over, the roof 14 of the vehicle 10 may be provided with a rigid structure that absorbs impact and will not weaken the structural integrity of the roof 14.

Figure 5:
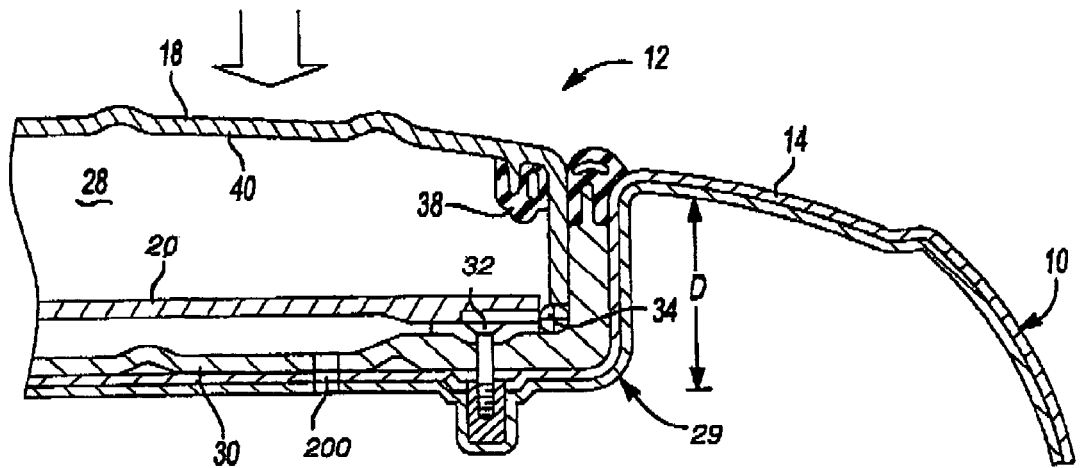
FIG. 5 is a partial rear cross-sectional view of the integrated roof-top cargo carrier in a stowed position according to the present teachings.
Figure 6:
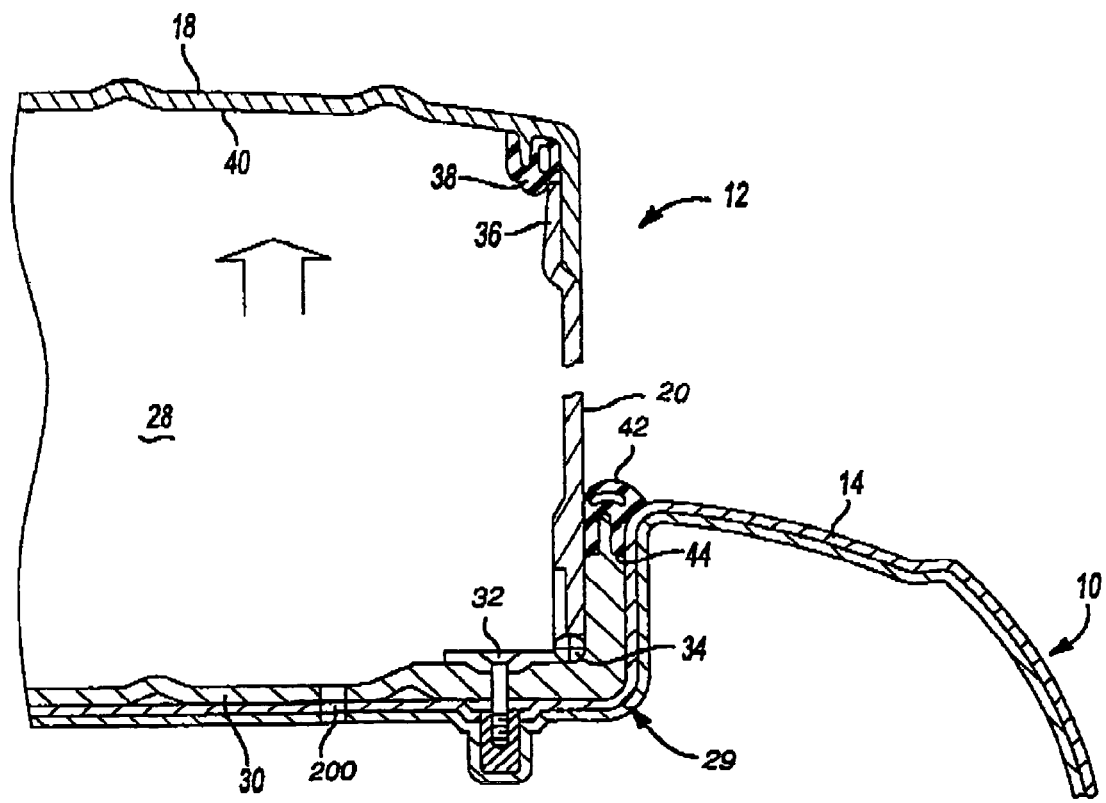
FIG. 6 is a partial rear cross-sectional view of the integrated roof-top cargo carrier in a deployed position according to the present teachings.
Figure 7:
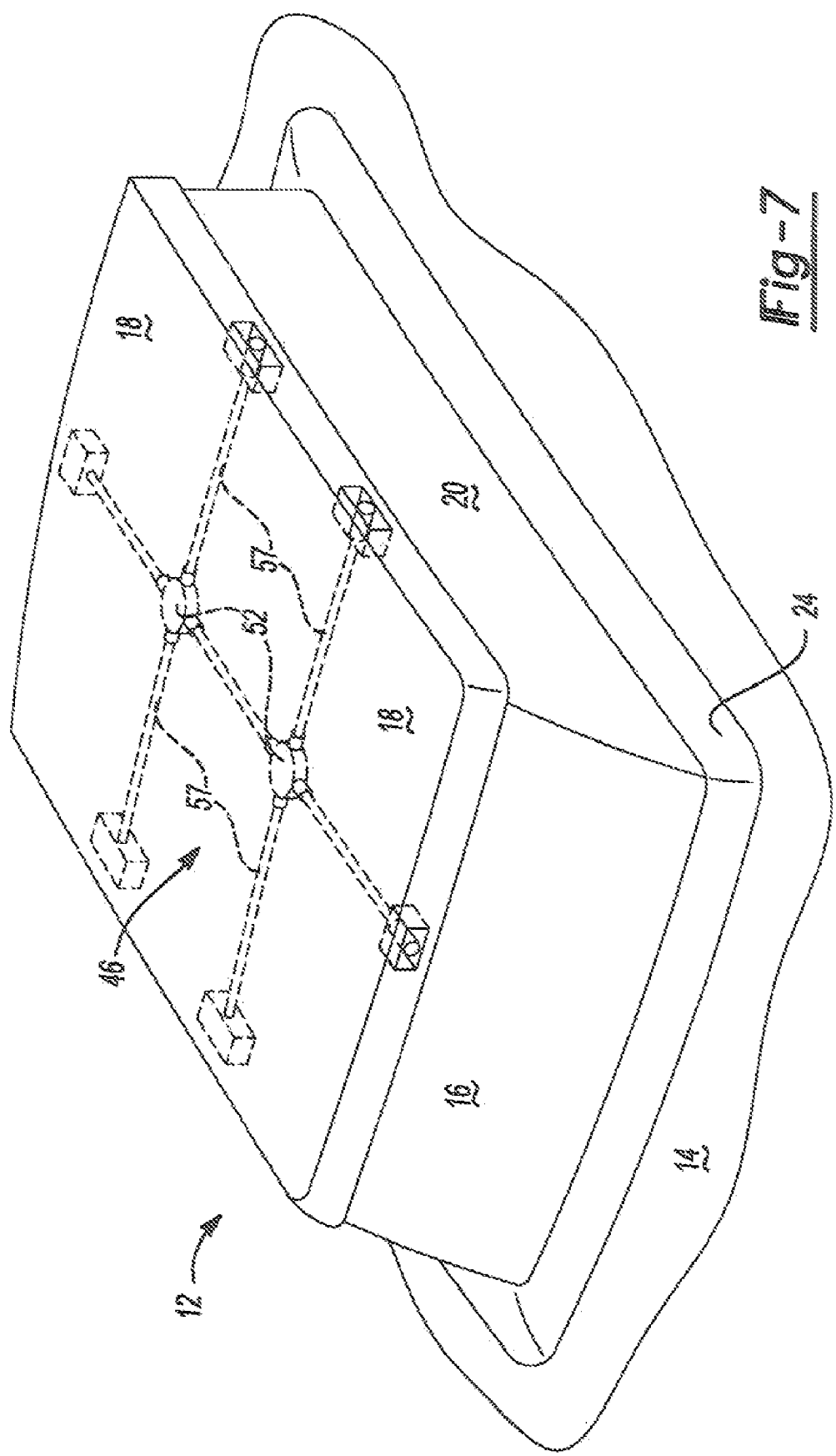
FIG. 7 is a perspective view showing various elements of a deployment system of the roof-top cargo carrier according to the present teachings.

Now referring to FIGS. 5 and 6, integration of the cargo carrier 12 within the roof-top 14 of the motor vehicle 10 is illustrated. The roof-top 14 of the vehicle 10 includes a recessed portion 29 that enables the un-deployed cargo carrier 12 to sit therein. A depth D of the recessed portion 29 is generally about 50 mm, but may be any depth so long as there is sufficient room to accommodate the un-deployed cargo carrier 12. The cargo carrier 12 includes a bottom panel or pan 30 that is secured to the recessed portion 29 of the vehicle roof 14 with fasteners 32 such as screws or bolts. The pan 30, however, may be secured to the recessed portion 29 via welding or some other type of connection method without departing from the spirit and scope of the present teachings.

The cargo carrier 12 sits within the recessed portion 29 of the roof 14 such that the top panel 18 forms a substantially coplanar surface with the roof 14. In this manner, the cargo carrier 12 does not increase aerodynamic drag of the vehicle 10 when the cargo carrier 12 is in its un-deployed state. The side panels 20 may be adapted to fold within the interior 28 of cargo carrier 12 to be substantially parallel with the bottom panel when the cargo carrier in its un-deployed state. The side panels 20 are connected to the pan 30 of the deployable cargo carrier 12 with a hinge 34 such that, as shown in FIG. 6, when the side panels are in their upright position, the side panels 20 will be substantially perpendicular to the pan 30.

As can be seen in FIG. 6, when the side panels 20 are in the upright position (i.e., a position where the cargo carrier 12 is deployed), an edge 36 of the side panel 20 contacts a seal or gasket 38 that is formed on an underside 40 of the top panel 18. Further, another gasket or seal 42 is present where the pan 30 meets the roof-top 14 of the vehicle 10. In this manner, the cargo carrier 12 is sufficiently sealed to prevent, or at least substantially minimize, moisture or dust from entering the interior 28 of the cargo carrier 12. The seal or gasket 42 formed at the interface 44 between pan 30 and the roof-top 25 also prevents, or at least substantially minimizes, the entry of moisture or dust into the interface 44 when the cargo carrier 12 is in its un-deployed state.

The pan 30 may be formed to include a drain 200 that may be in communication with a drainage line (not shown) that enables the pan to drain any water that may accumulate in the interior 28 of the cargo carrier 12. The drain 200 may drain similar to a drain that is used for a sunroof or moonroof as is known in the art.

To deploy the cargo carrier 12, the side panels 20 may be used to raise the top panel 18. To raise the side panels 20, referring to FIGS. 7 through 10C, the cargo carrier 12 may include a deployment system 46 that may include various cables 48 coupled to various pulleys 50. The cables 48 and pulleys 50 may be used to raise the side panels 20 to the perpendicular orientation shown in FIG. 6, which in turn may be used to raise the top and front panels 18 and 16 of the cargo carrier 12.

Figure 8A:
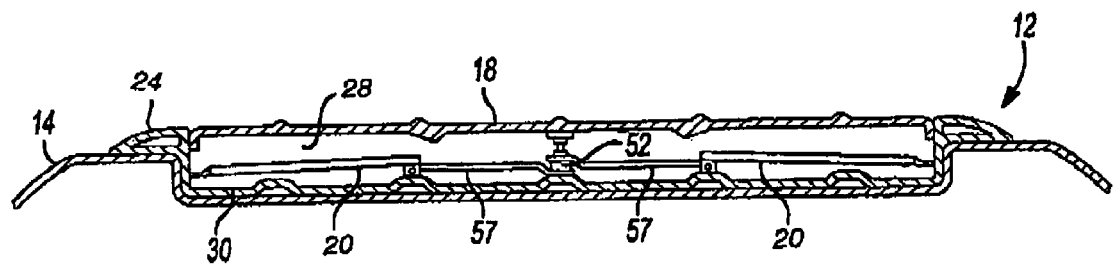
FIGS. 8A-8C are rear cross-sectional views of the deployment system illustrated in FIG. 7.
Figure 8B:
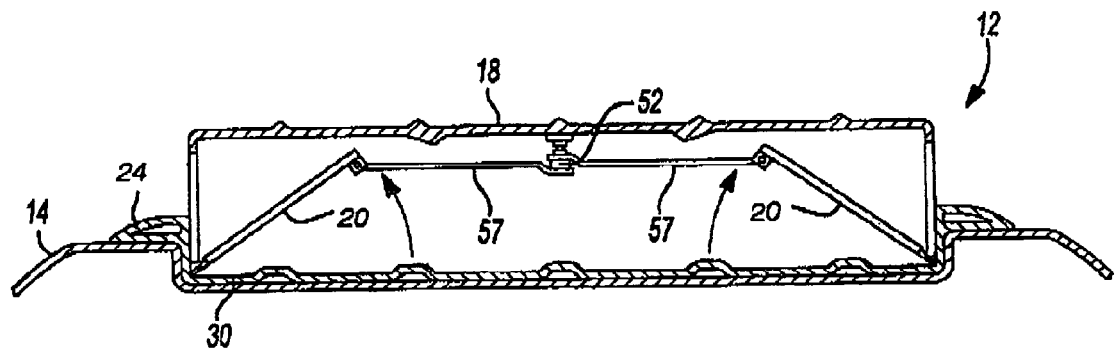
Figure 8C:
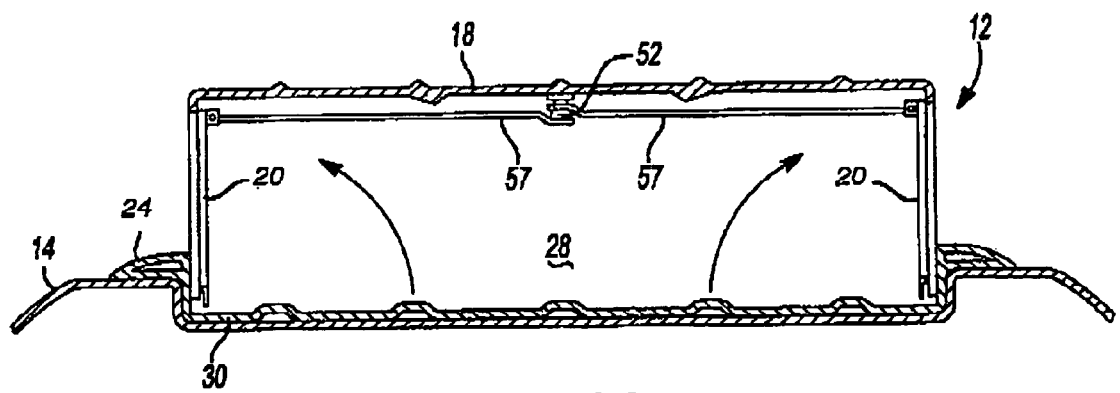

The deployment pulley system 46 includes a pair of spreading devices 52 that are secured fixed to a support bar 54 that extends in a longitudinal direction of the vehicle 10. The support bar 54 may be secured at ends 56 thereof to the spreading devices 52, and the spreading devices 52 may be secured to the top panel 18. Rotatably coupled to the pair of spreading devices 52 are deployment rods 57 that, when in the cargo carrier 12 is fully deployed, will extend transversely relative to the support bar 54. More specifically, as best shown in FIGS. 8A to 8C, as the cargo carrier 12 is deployed from its closed or stowed position to its fully extended position, the side panels 20 are lifted into their perpendicular orientation relative to the pan 30 of the cargo carrier 12 as the deployment rods 57 rotate outward from the support bar 54.

Figure 9A:
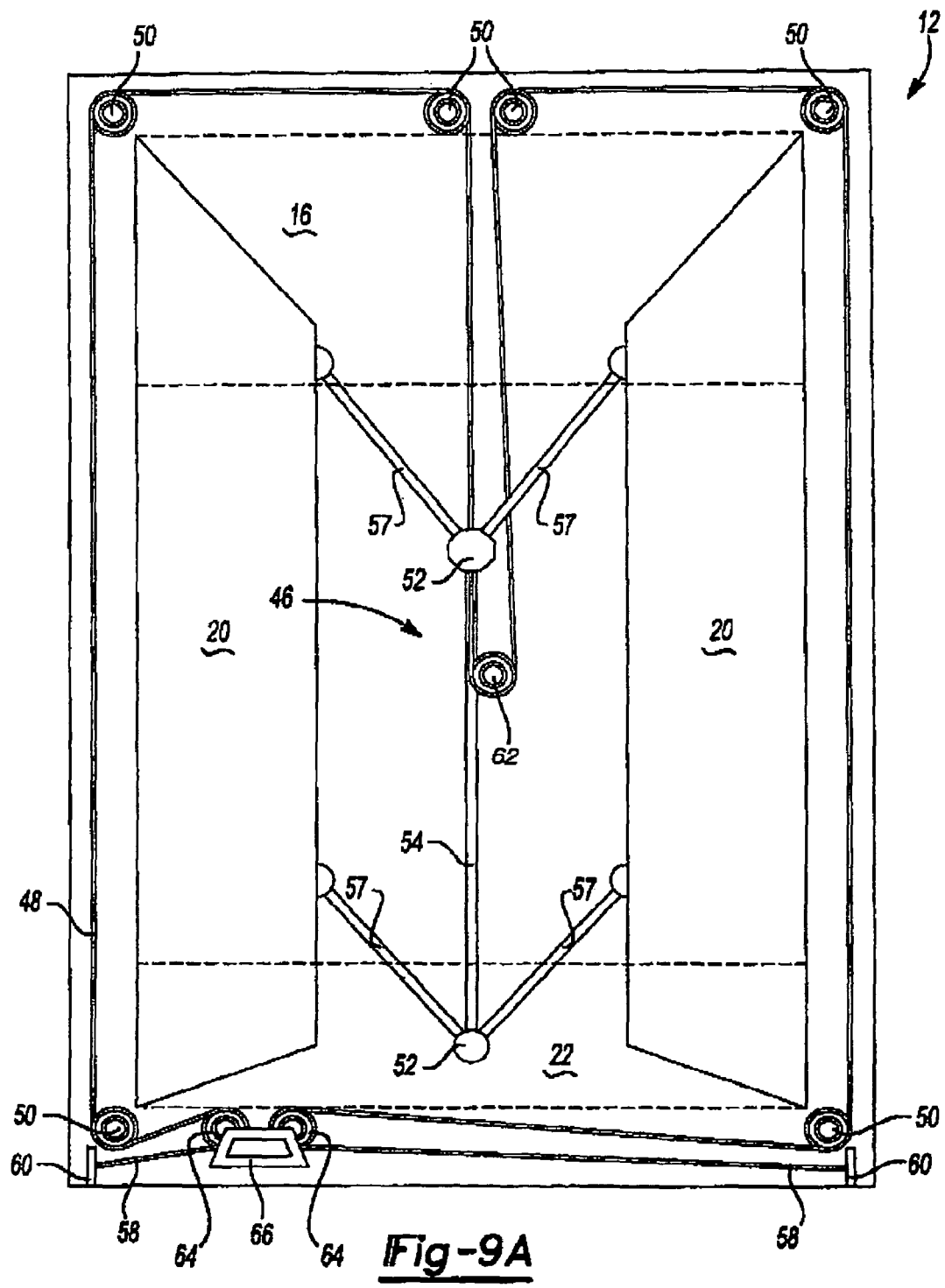
Figure 9C:
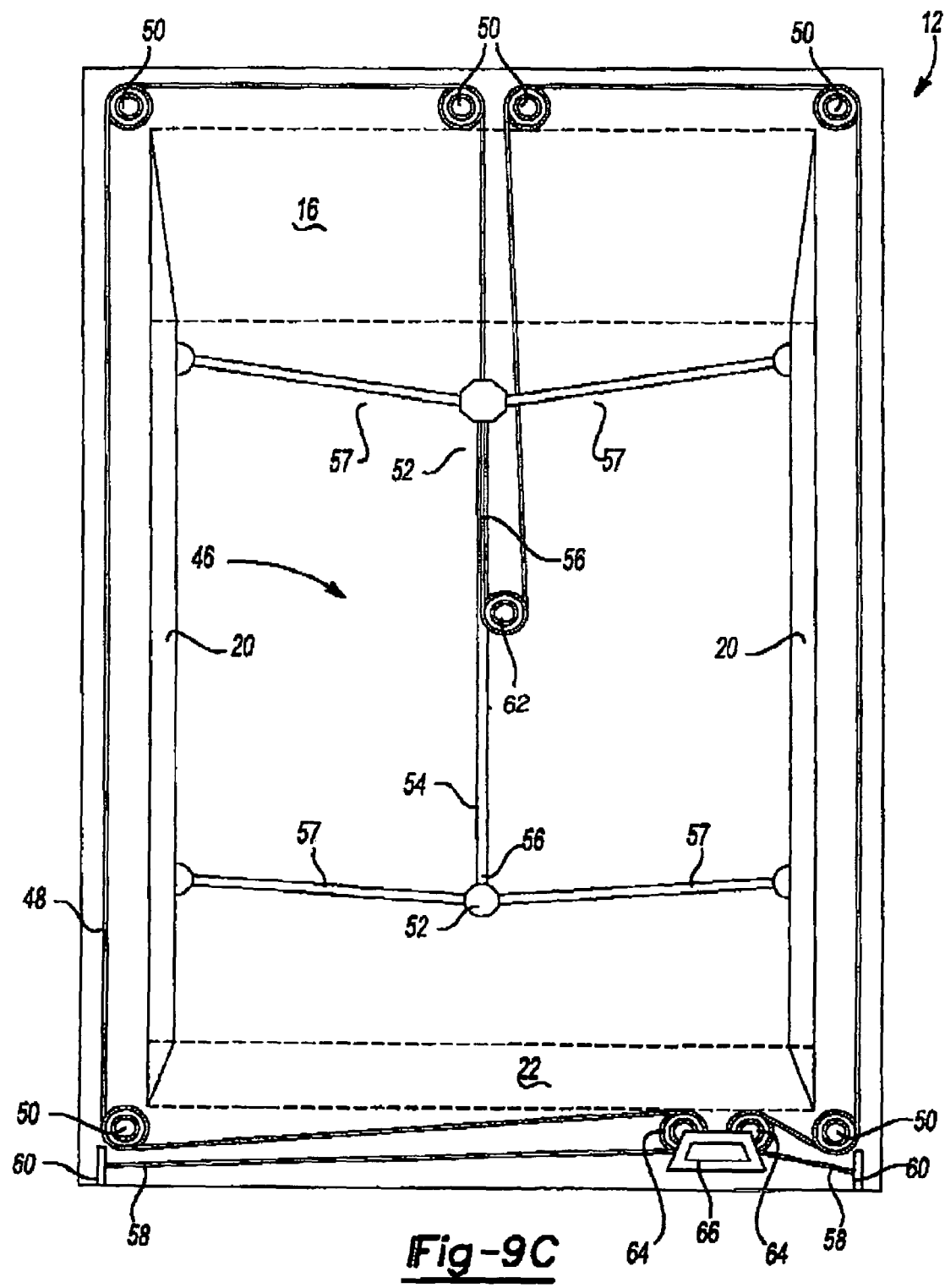

As best shown in FIGS. 9A to 9C, the pulley system 46 includes a steel cable 48 that may be disposed within the collar 24 of the cargo carrier 12. The cable travels 48 through various pulleys 50 disposed at various points throughout the deployment system 46. Ends 58 of the cable 48 are secured to a pair of fixtures 60. At least one pulley 62 is secured to the support bar 54 so that when the cargo carrier 12 is to be deployed, tensional force exerted on the cable 48 will pull the support bar 54 in a direction toward the front 59 of the vehicle 10, As the support bar 54 is pulled in the direction toward the front 59 of the vehicle 10, the deployment rods 57 are forced to rotate and extend transversely relative to the support bar 54. Since the side panels 20 are connected to the deployment rods 57, the side panels 20 are raised to their extended (i.e., perpendicular) positions, which in turn raises the front and top panels 16 and 18. To actuate the pulley deployment system 46, at least one pulley 64 is secured to a handle 66 that may be slidably coupled to the roof-top 14 of the vehicle 10 or collar 24 of the cargo carrier 12. An exemplary handle 66 is illustrated in FIG. 10.

In FIG. 9A, the pulley deployment system 46 id shown when the cargo carrier 12 is in the stowed position. In the stowed position, the deployment rods 57 are angled relative to the support bar 54. As can be seen in FIG. 9B, however, as the handle 66 is slidably moved to actuate the pulley deployment system 46, the cable 48 of the pulley system 46 pulls the support bar 54 and spreading devices 52 in the direction towards the front 59 of the vehicle 10. This in turn forces the deployment rods 57 to begin to rotate to the extended position.

Now referring to FIG. 9C, it can be seen that the handle 66 has been fully moved to the deployed position. The support bar 54 has been fully pulled towards the front 59 of the vehicle, and the deployment rods 56 have fully rotated to the extended position that is substantially perpendicular relative to the support bar 54. Due to the full rotation and extension of the deployment rods 57, the side panels 20 have been raised to be orthogonal to the pan 30, which in turn raised the front and top panels 16 and 18.

It should be understood that although the pulley system 46 of the present teachings may be manually deployed by using the exemplary handle 66 shown in FIGS. 9 and 10, the pulley system 46 may be deployed automatically using a motor (not shown). Alternatively, deployment systems shown in FIGS. 11 through 16 may be used to deploy the cargo carrier 12 of the present teachings.

Figure 11A:
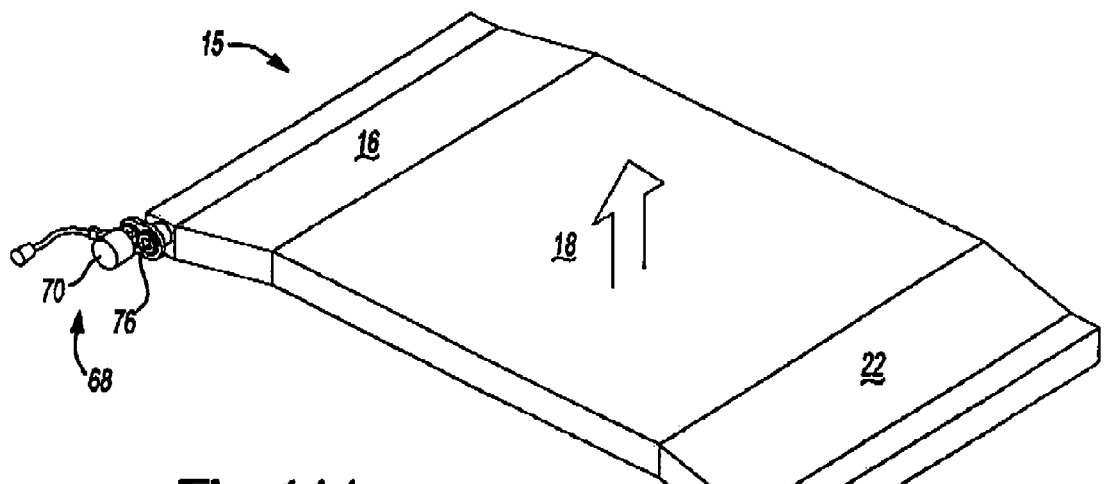
FIGS. 11A and 11B are a perspective and partial-perspective view of a deployment system according to the present teachings.
Figure 11B:
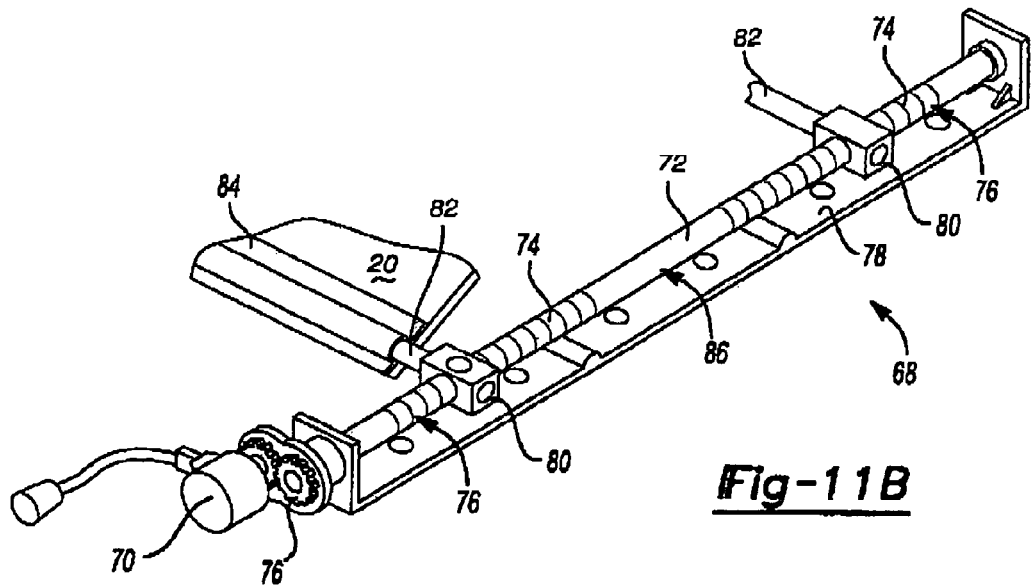

As can be seen in FIGS. 11A and 11B, the cargo carrier 12 may be deployed using a pair of rotational deployment systems 68 that are driven by at least one electric motor 70. The rotational deployment systems 68 generally include a crank pin or axle 72 that includes a pair of threaded surfaces 74 at ends 76 thereof. The axles 72 are supported by a bracket 78 that may be housed within the collar 24 of the cargo carrier 12. The axles 72 are rotated by the electric motor 70 through a series of gears 76.

Connected to each of the threaded surfaces 74 is a screw brick 80 that may be rotationally translated along the threaded surfaces 74 as the axle 72 is rotated by the electric motor 70. The screw bricks 80 are similar to a U-joint in that the screw bricks 80 translate this rotational motion to another pin 82, which is fixed to the side panels 20 via an attachment plate 84. More particularly, as the electric motor 70 rotates the axle 72, the screw bricks 80 will move from an central potion 86 of the axle towards the ends 76 of the axle 72. As the screw bricks 80 move along the threadings 74, the rotational motion is translated to the pins 82 that are connected to the side panel via the attachment plates 84. As the pins 82 rotate, the side panels 20 will also be rotated from a horizontal position to a vertical position. Similar to above-described configurations, rotation of the side panels 20 in turn lifts the front and top panels 16 and 18 of the cargo carrier 12.

Figure 12:
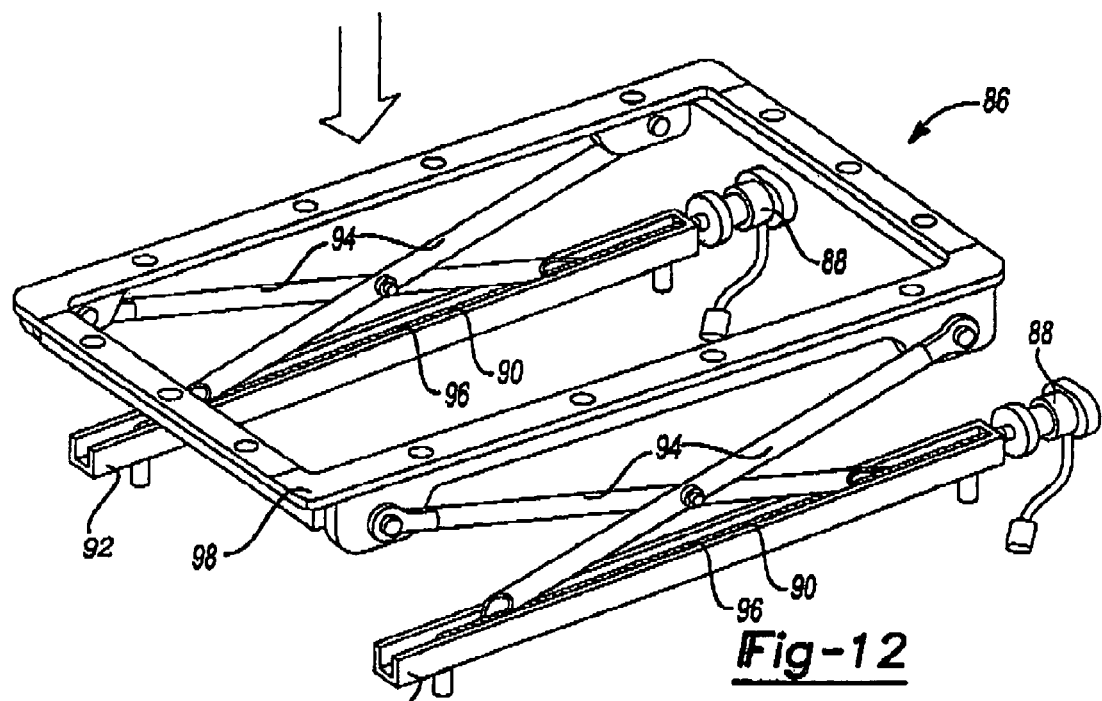
FIG. 12 is a perspective view of a deployment system according to the present teachings.

In FIG. 12, the cargo carrier 12 may be deployed using a scissor lift 86. The scissor lift 86 may be actuated by electric motors 88 that rotate a pair of screws 90. The screws 90 are supported by a pair of support tracks 92. Threadingly engaged with the screws 90 are the legs 94 are the legs 94 of the scissor lift 86.

As the screws 90 are rotated by the electric motor 88, the legs 94 of the scissor lift 86 travel along the threading 96 of the screws 90 to extend the legs 94 of upward relative to the roof 14 of the vehicle 10. A base assembly 98 that supports the top panel 18 is attached to the legs 94, the base assembly 98 and top panel 18 are also lifted relative to the roof panel 14 to fully deploy the cargo carrier 12.

Figure 13:
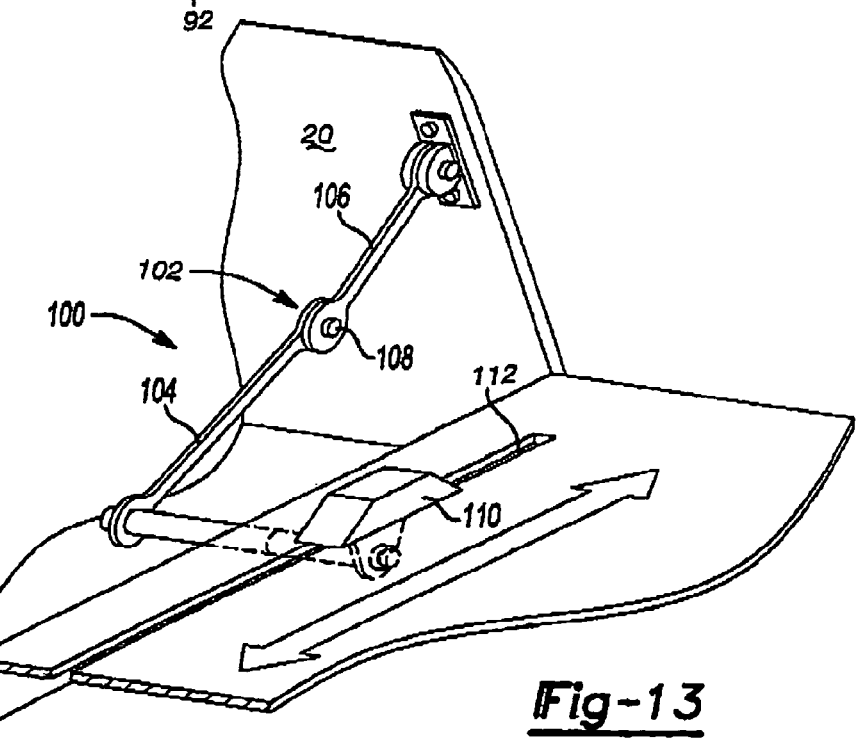
FIG. 13 is a partial perspective view of a deployment system according to the present teachings.

In FIG. 13, the side panels 20 may be coupled to a lift arm deployment system 100. The lift arm deployment system 100 includes at least one lift arm 102 attached to each side panel 20. The lift arm 102 includes a pair of support arms 104 and 106 that are connected at a hinge 108. Lift arm 104 is connected to an actuation device 110 such as a handle that, similar to the pulley deployment system 46, is slidably coupled to a track 112. As the handle 110 slides along the track 112, the support arms 104 and 106 may rotate at the hinge 108 to lift the side panels 20 to an upright position. As the side panels 20 rise to the upright position, the top and front panels 16 and 18 are raised in a manner similar to the configurations described above to fully deploy the cargo carrier 12.

Figure 14:
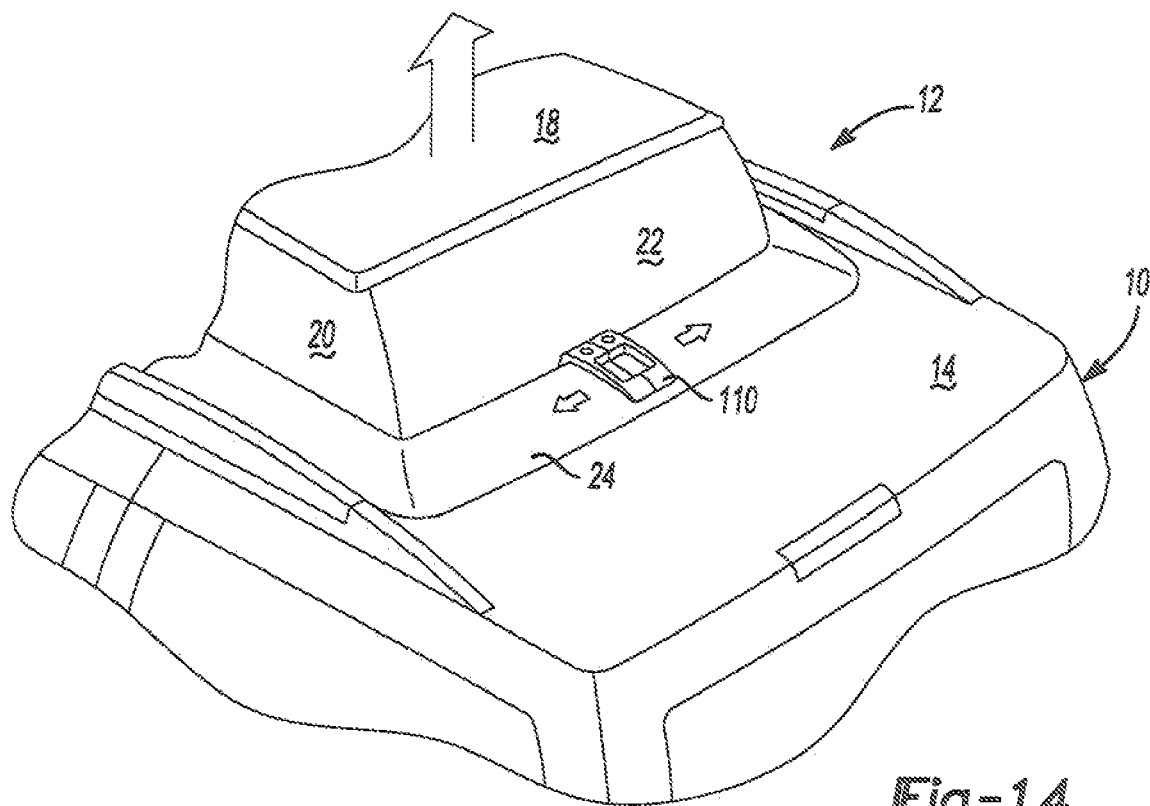
FIG. 14 is a perspective view of an actuation device that may be used to actuate a deployment system according to the present teachings.

The lift arm deployment system 100 may be actuated by a manual handle 110 as shown in FIG. 14, or electrically via electric motors (not shown) similar to those described in previous configurations. Regardless, it should be understood that any of the deployment methods that may be actuated either manually or automatically.

Figure 15:
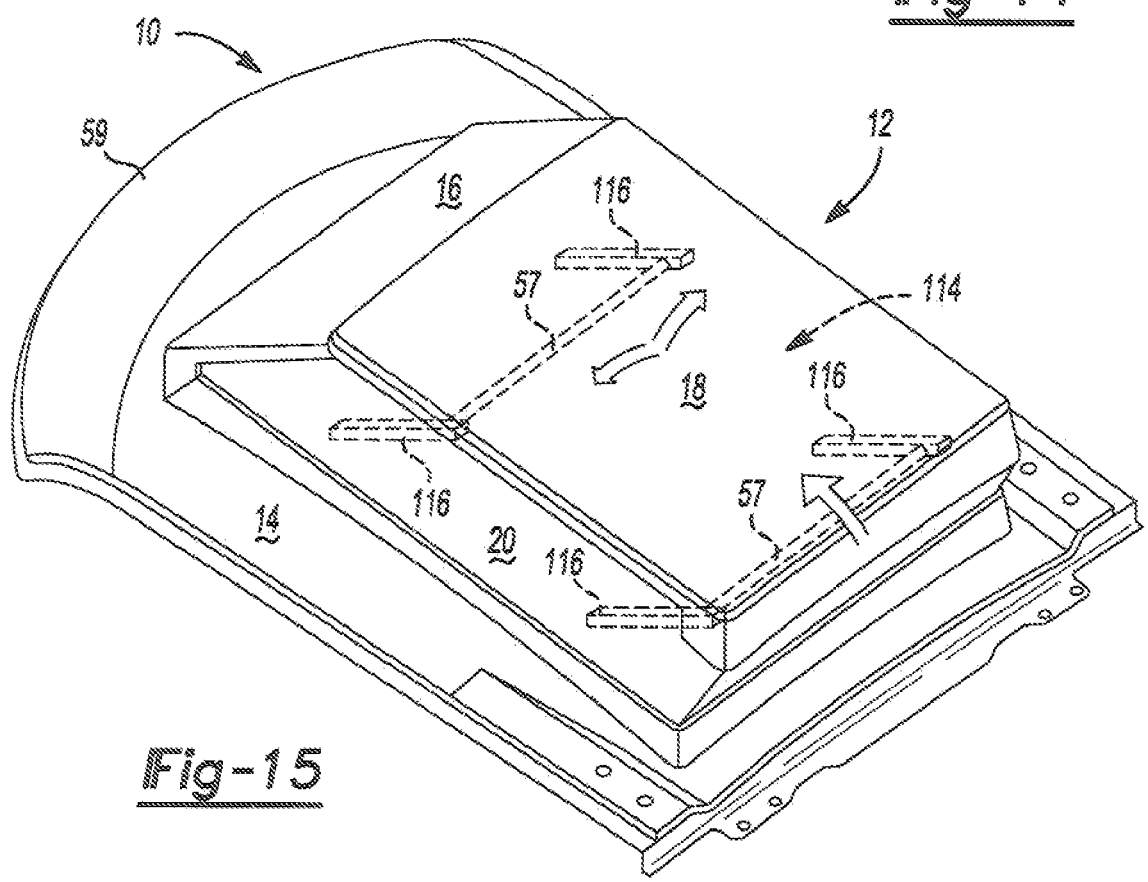
FIG. 15 is a perspective view of a deployment system according to the present teachings.

In FIG. 15, a four bar link deployment system 114 is used to lift the side panels 20 of the deployable cargo carrier 12. The four bars 116 may be actuated by a pulley system similar to that described above, or may be movably actuated by an electronic motor (not shown). If a pulley system (not shown) is used, the same configuration shown in FIGS. 9A to 9C may be used, except the deployment rods 57 should be fixed to the support bar (not shown) instead of rotatably coupled thereto. In this manner, the deployment rods 57 will be pulled in the direction of the front 59 of the vehicle 10 along with the support bar, which will pull the four bars 116 forward and upward to raise the side panels 20, as well as the front and top panels 16 and 18. The four bars 116 may be hingedly attached to the pan 30 of cargo carrier 12.

Figure 16:
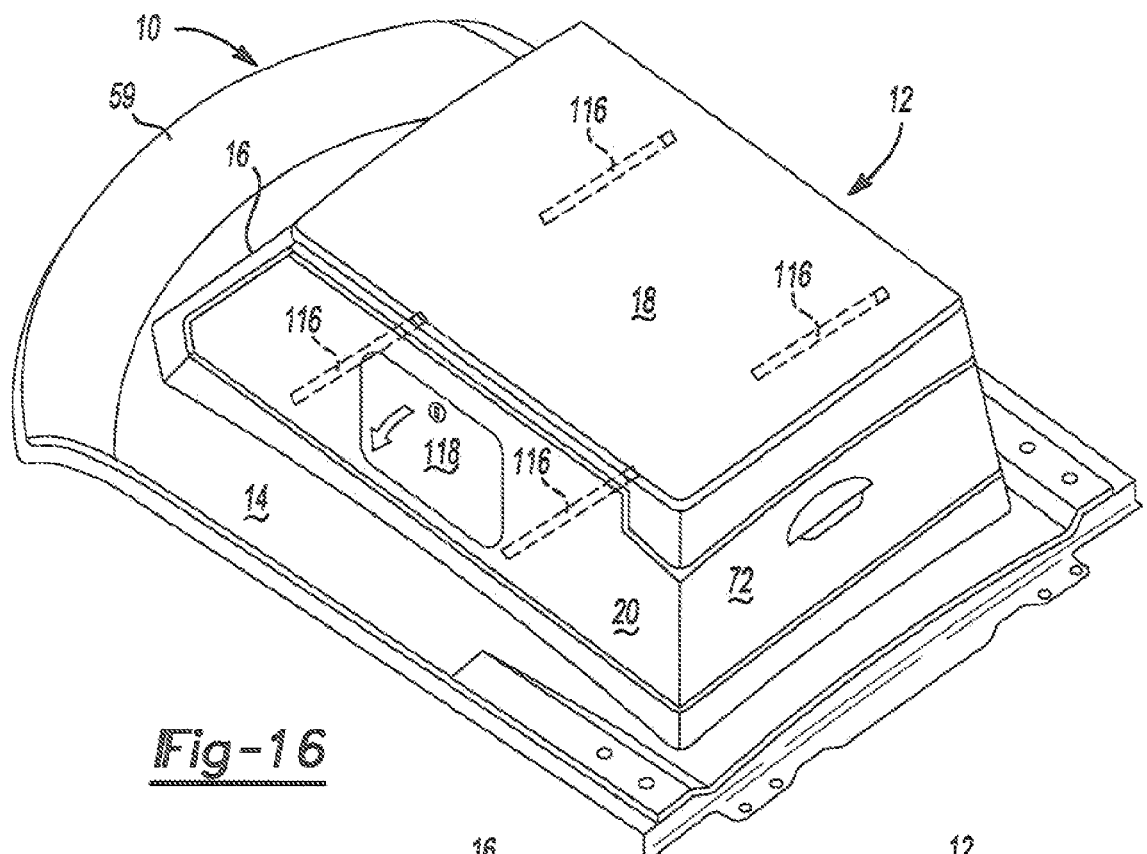
FIG. 16 is a perspective view of an integrated roof-top cargo carrier according to the present teachings.

As can be seen in FIG. 16, it should be understood that the side panels 20 may also be adapted to include a lockable side access door 118 that may be formed in the side panels 20 or the rear panel 72. Regardless, it should be understood that the side access doors 118 provide access to the interior 28.

Figure 17:
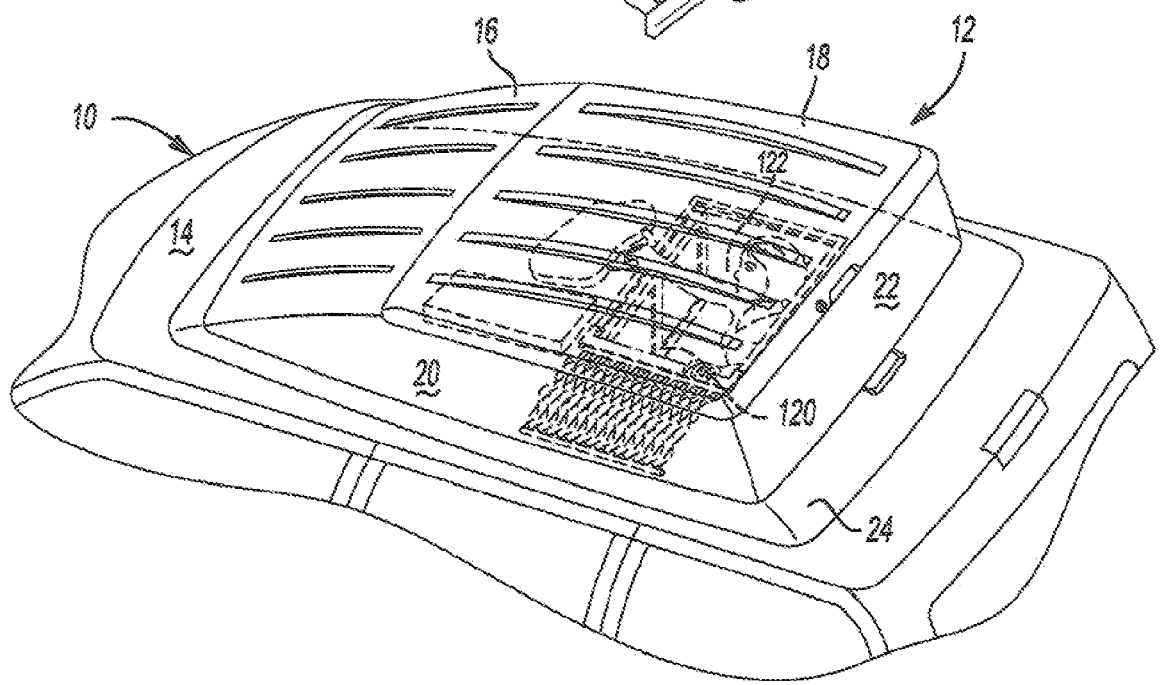
FIG. 17 is a perspective view of an integrated roof-top cargo carrier according to the present teachings.
Figure 18:
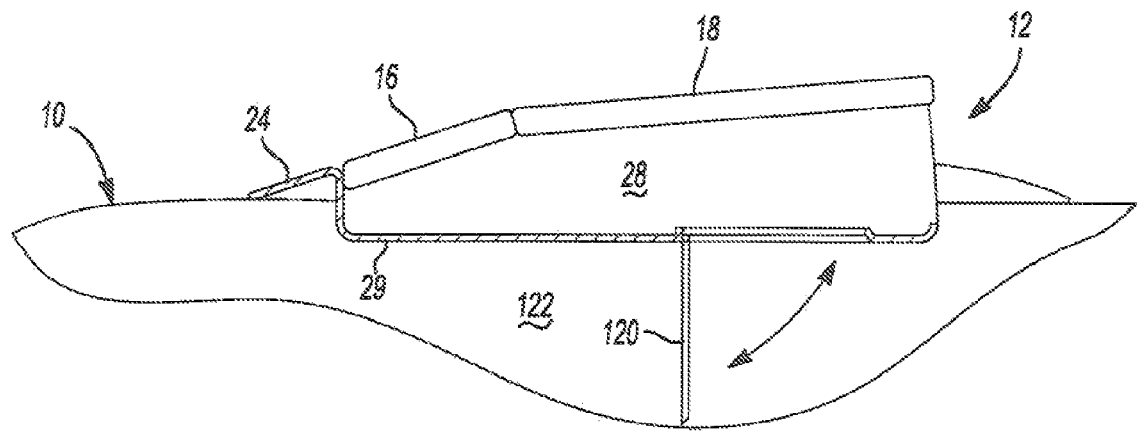
FIG. 18 is a side cross-sectional view of an integrated roof-top cargo carrier according to the present teachings.
Figure 19:
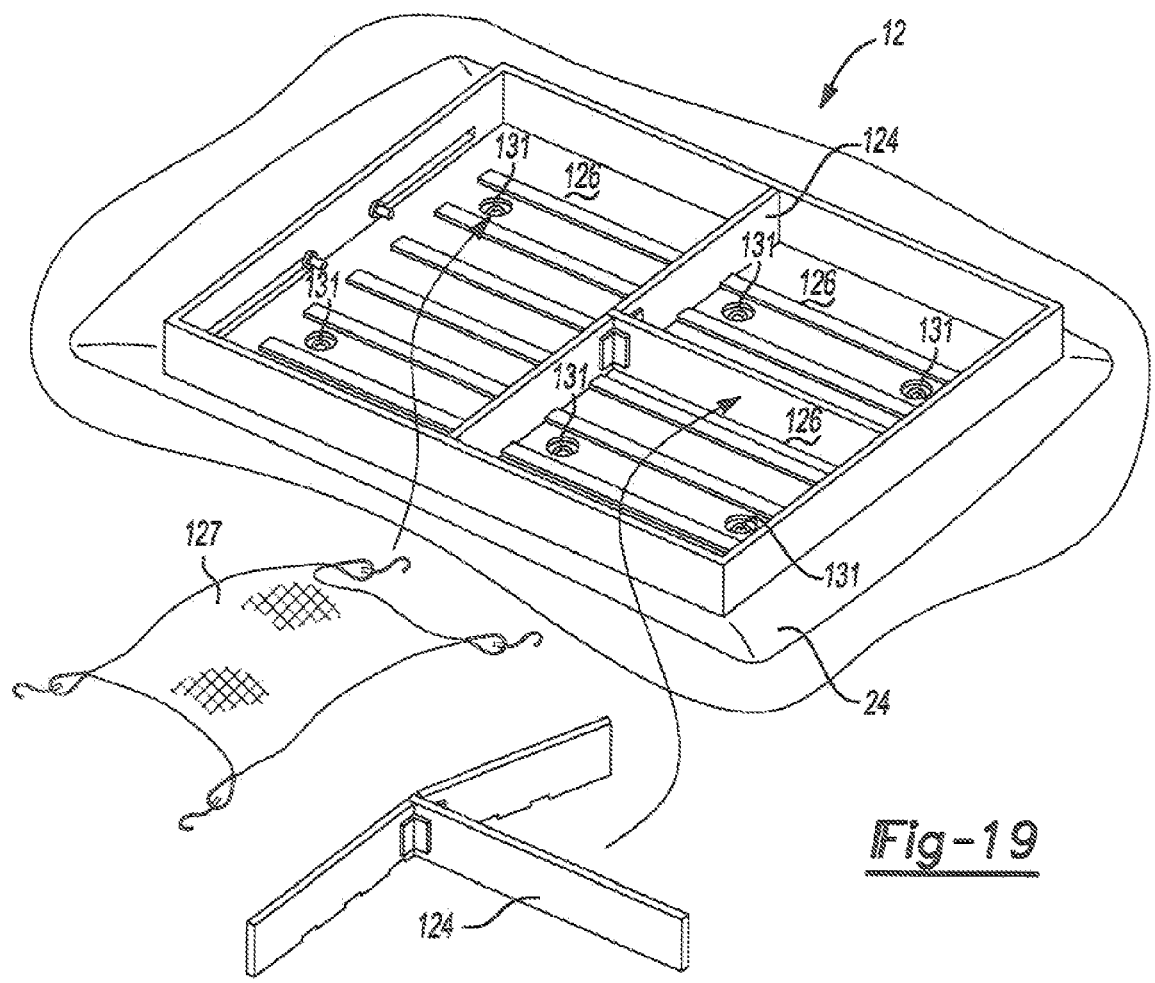
FIG. 19 is an interior view of an integrated roof-top cargo carrier according to the present teachings.
Figure 20:
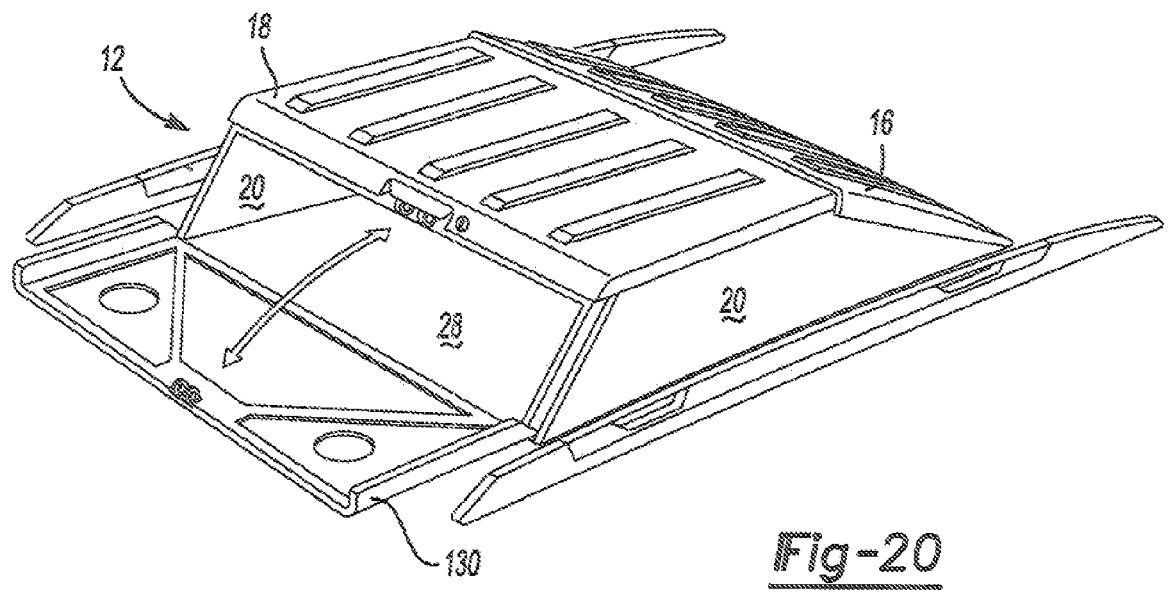
FIG. 20 is a perspective view of an integrated roof-top cargo carrier according to the present teachings.

Now referring to FIGS. 17-20, additional configurations of the cargo carrier 12 are illustrated. In FIGS 17 and 18, the cargo carrier 12 be adapted to include an interior access hatch 120 that enables access to the interior 28 of the cargo bay from the inside or cabin 122 of the motor vehicle 10. In FIG. 19, the deployable cargo carrier 12 may be adapted to include a plurality of folding dividing walls 124 that may be installed into the deployable cargo carrier 12. In this manner, the deployable cargo carrier 12 may be separated into various chambers 126 that may assist in organizing the items to be stored. Lastly, as can be seen in FIG. 20, the deployable cargo carrier 12 may include a rear access panel 130 that may be open to fully expand the deployable cargo carrier 12.

The description of the invention is merely exemplary in nature and, thus, variations that do not depart from the gist of the invention are intended to be within the scope of the invention. Such variations are not be regarded as a departure from the spirit and scope of the invention.

What is claimed is:

1. A cargo carrier integrated with a roof of a motor vehicle, comprising:
   a pan secured to a recessed portion of the roof;
   a pair of side panels rotatably coupled to said pan;
   a front panel hingedly attached to said pan;
   a top panel hingedly attached to said front panel; and
   a deployment mechanism coupled to said side panels, said deployment system including at least one pulley connected to a support bar that extends along substantially an entire length of and is connected to said top panel, and a plurality of deployment rods rotatably coupled to said support bar and said side panels such that when said side panels are deployed from a stowed position to a deployed position said deployment rods are urged to a position substantially perpendicular to said support rod in a width direction of said top panel;
   wherein rotation of said deployment rods to said position substantially perpendicular to said support rod rotates said side panels from said stowed position to said deployed position and lifts said top panel and said front panel.

2. The cargo carrier of claim 1, wherein said side panels include an access door.

3. The cargo carrier of claim 1, wherein said top panel is pivotable.

4. The cargo carrier of claim 1, wherein in said stowed position, said side panels fit within said pan.

5. The cargo carrier of claim 1, wherein in said stowed position, said top panel and said front panel are substantially co-planar with the roof of the vehicle.

6. The cargo carder of claim 1, wherein said pan includes a drain.

7. The cargo carrier of claim 1, further comprising a gasket disposed between said pan and said side panels when said side panels are in said deployed position.

8. The cargo carrier of claim 7, wherein said gasket is disposed between said pan and said top panel when said side panels are in said stowed position.

* * * * *